Patented Dec. 13, 1927.

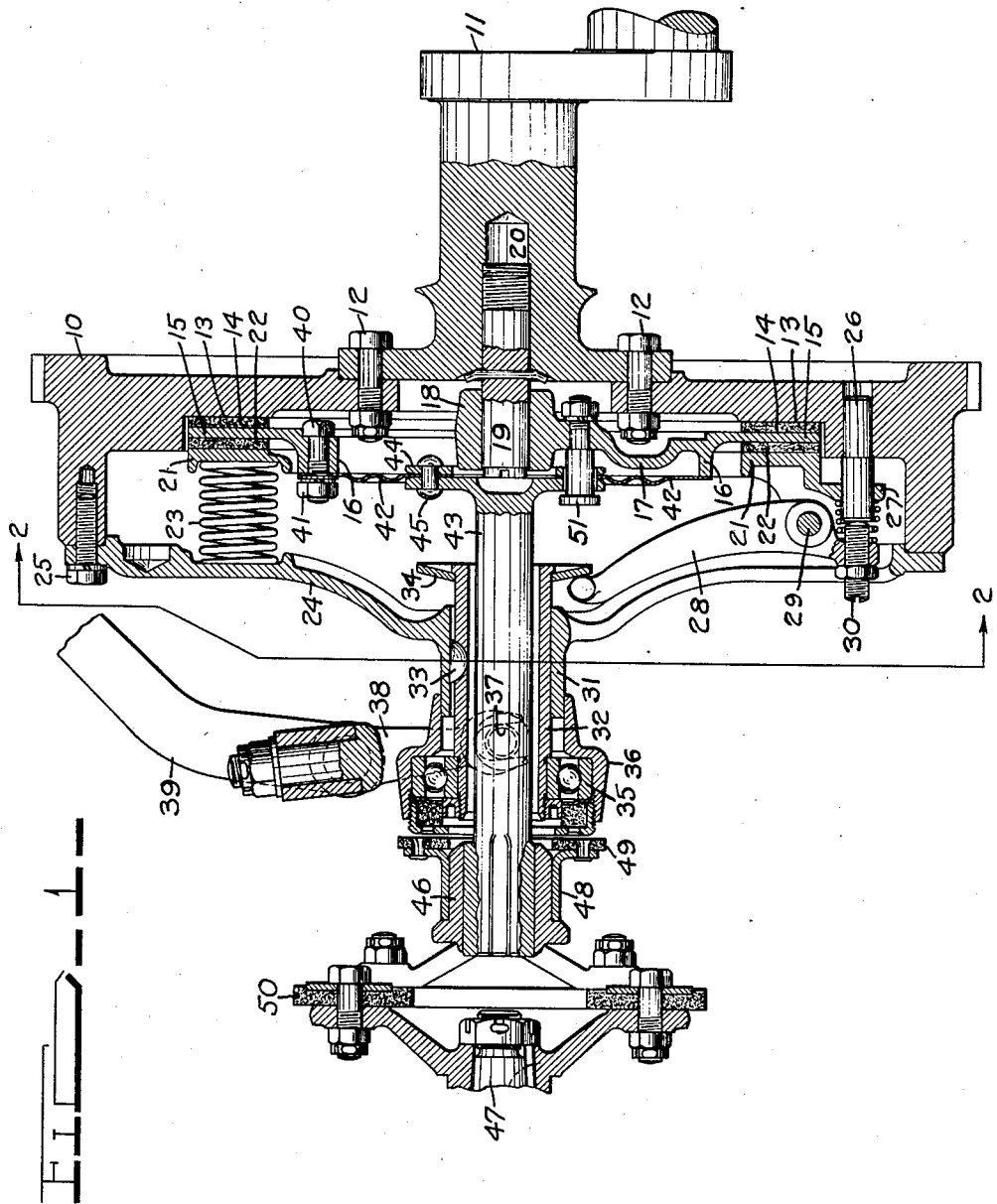

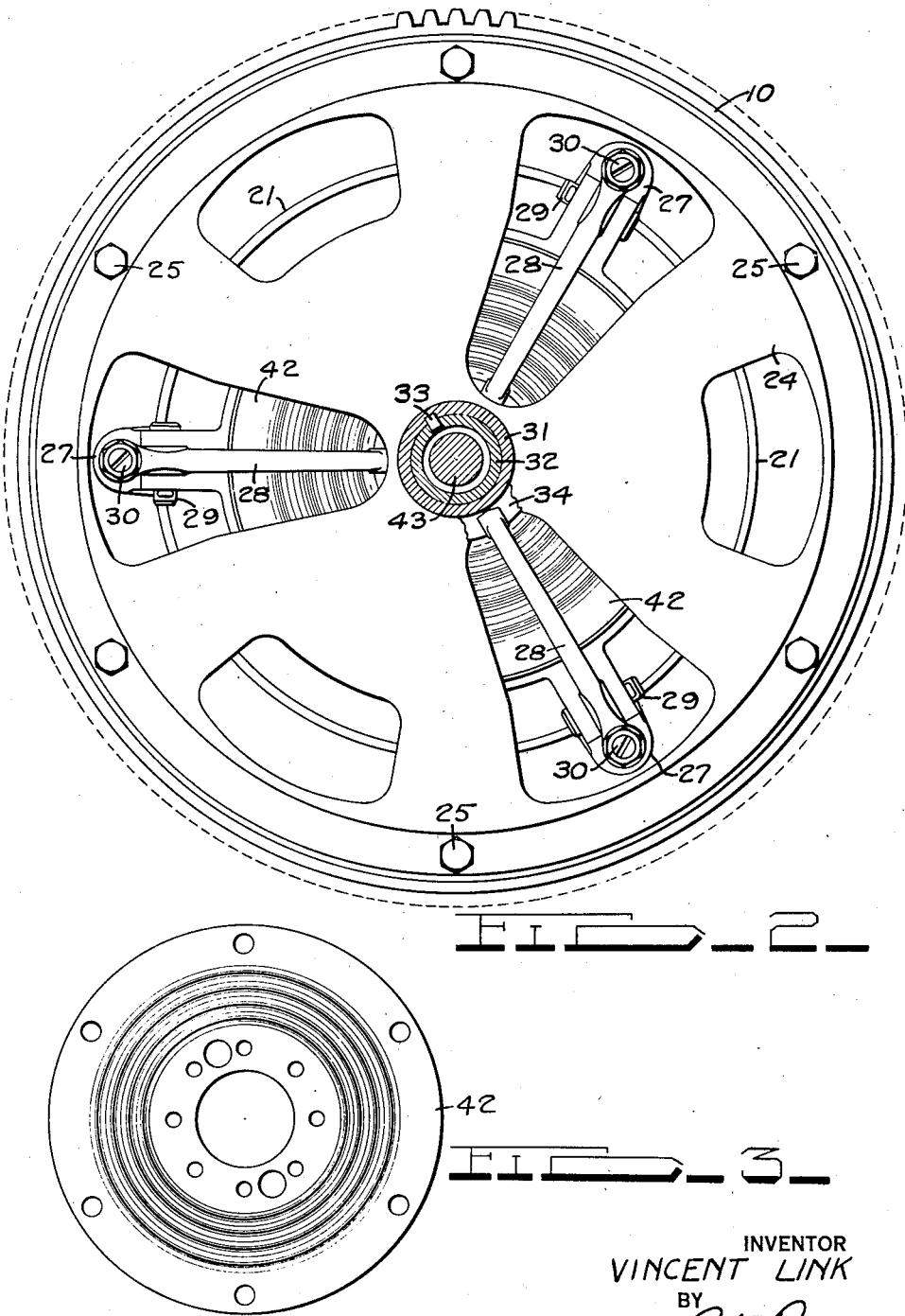

1,652,446

UNITED STATES PATENT OFFICE.

VINCENT LINK, OF DETROIT, MICHIGAN, ASSIGNOR TO THE STUDEBAKER CORPORATION, OF SOUTH BEND, INDIANA, A CORPORATION OF NEW JERSEY.

CLUTCH.

Application filed March 4, 1925. Serial No. 13,010.

This invention relates to clutches, and particularly to the friction type suitable for use in connection with motor vehicles, and has for its principal object to provide a friction clutch in which the driven member is connected to the driven shaft by a flexible member which transmits the drive therethrough.

Another object is to provide a clutch of the class described in which there is a relatively non-distortable driven clutch member held in parallel relation to the face of the clutch driving member, the driven member being connected to the driven shaft by a flexible member whereby the axis of said driven shaft may be non-coincidental or out of line with the axis of said driven member without affecting the operation of said clutch.

A further object is to provide a clutch of the class described in which a relatively non-distortable driven member is connected to the driven shaft by a flexible member, means being provided for preventing distortion of said flexible member beyond its elastic limit.

The above being among the objects of the present invention, the same consists of certain novel features of construction and combinations of parts to be hereinafter described with reference to the accompanying drawings, and then claimed, having the above and other objects in view.

In the accompanying drawings which illustrate a suitable embodiment of the present invention, and in which like numerals refer to like parts throughout the several different views, Figure 1 is a sectional view taken in a vertical plane through the axis of a disc clutch, adapted for use in connection with motor vehicles.

Figure 2 is a view of the back face of the clutch of Figure 1 taken on the line 2—2 of Figure 1.

Figure 3 is a face view of the flexible disc used in the clutch shown in the preceding views.

The clutch shown makes use of the engine flywheel 10, which is secured to the engine crank-shaft 11 by the bolts 12, as one of the clutch members as in the conventional constructions, it being provided with a flat, annular face 13 faced with the friction ring 14. The clutch driven member consists of an annular contact face or portion 15 adapted to seat against the ring 14, an annular sleeve portion 16, and one or more arms 17 which extend radially inward from the contact portion 15 and join the hub 18 which is rotatably supported on the pin 19 threadably secured in the axial opening 20 in the crank shaft 11. The driven member is thus supported on the pin 19 so that the annular contact portion 15 is at all times in parallel relation to the face 13 and ring 14 of the flywheel 10.

A conventional clamping ring or pressure plate 21 faced with a second friction ring 22 is provided to clamp the annular portion 15 of the driven member between the same and the annular face 13, the clamping action being obtained through the pressure of a plurality of coil springs 23 interposed under compression between the pressure plate 21 and the cover plate 24 of the flywheel 10 which is secured to the latter by screws 25. The pressure plate 21 is supported on and caused to rotate with the flywheel 10 by a plurality of pins 26 secured in the flywheel 10 which slidably engage ears 27 formed on the periphery of the pressure plate 21. The ears 27 also pivotally support the clutch throw-out arms 28 by means of the pins 29, the outer ends of the arms 28, beyond the pins 29, being provided with adjustable screws 30 which bear against the ends of the pins 26 so that upon rearward movement of the inner ends of the arms 28 the pressure plate 21 will be drawn back against the pressure of the springs 23 out of contact with the driven member, and will thereby allow the driven member to rotate independently of the flywheel 10.

The cover plate 24 terminates at its central portion in the rearwardly extending axial sleeve 31 which slidably receives therein the sleeve 32, which is prevented from turning in respect thereto by a key 33, and is provided at its forward end with an outwardly extending annular flange member 34 against the rear face of which the inner ends of the throw out arms 28 are adapted to seat. The rear end of the sleeve 32 projects past the rear face of the sleeve 31 and receives thereon a relatively non-axially movable ball thrust bearing 35 which in turn rotatably receives the housing 36 thereon. The housing 36 is provided with two outwardly extending radial pins 37 which are received by the slotted ends of the yoke 38, the latter being capable of being rocked about a horizontal pivot above the axis of the sleeve 32 in a conventional manner by the clutch throwout pedal lever 39. It is evident that, as in the conventional constructions, when the upper end of the lever 39 is moved forward or to the right, the yoke 38 is rocked and its slotted lower ends in moving rearwardly carry the pins 37 therewith, the housing 36, bearing 35, sleeve 32 and flange 34 moving rearwardly in accordance with the movement of the pins 37, and causing the inner ends of the throwout arms 28 to move a corresponding distance rearwardly, thus releasing the clutch driven member from clamped relation between the pressure plate 21 and flywheel 10.

Secured to the rear edge of the annular sleeve portion 16 of the clutch driven member by a plurality of bolts 40 and nuts 41, or by other suitable means, is a disc 42 of relatively thin metal, preferably of a springy nature, and preferably provided with a plurality of axially concentric corrugations to increase its flexibility. If desired, a disc of a fabric composition can be substituted for the disc previously described. Its inner or central portion is secured between the flanged forward end of the clutch driven shaft 43 and the ring 44 by rivets 45 or other suitable means. The shaft 43 extends through the sleeve 32 in which it has ample clearance and non-rotatably but slidably receives on its rearwardly projecting splined end the hub 46 of the forward flange of a conventional fabric type of universal joint which may connect the driven shaft 43 to the forward end of a shaft 47 of a transmission (not shown). It will be evident that the disc 42 transmits all of the power from the driven member to the driven shaft 43, and that because of its flexible nature it will allow the axis of the driven shaft 43 to be out of line or non-coincident with the axis of the driven member without causing any binding of the latter on the pin 19 which supports it and holds its annular rim or contact portion 15 parallel with the contact face 13 of the flywheel 10. This allows for any disalignment of the clutch and transmission, and some means for this purpose is particularly necessary in those constructions where the transmission is supported separately from the engine, and not as a part thereof. Although means have heretofore been used to compensate for such disalignment, they have been of a type embodying a splined or keyed connection between the driven member and the driven shaft, such as the so-called "star shaft" construction, and in all of which there has been a rubbing action of the connecting parts with consequent wear, sticking, rattling, squeaking due to lack of oiling, and other such disadvantages. In the present construction there are no parts in the connection to wear or cause friction, and no parts to lubricate, so that these disadvantages of the conventional connections are eliminated.

As in the conventional constructions a so-called clutch brake is provided to prevent the spinning of the clutch driven member when the clutch is disengaged. In the present construction this is accomplished by securing a flanged collar 48 to the hub 46 of the universal joint connecting the driven shaft 43 to the transmission shaft 47, the flanged portion facing towards the bearing housing 36 and being provided with a friction facing 49 against which the non-rotatable bearing housing 36, or a part carried thereby, is adapted to bear when the clutch pedal 39 is depressed to disengage the clutch, and thus exert a frictional braking effect on the hub 46 and consequently the clutch driven member. As previously described the hub 46 is slidable on the shaft 43, the flexing of the fabric member 50 of the universal joint setting up enough resistance to hold the hub 46 against excessive end movement so that the effect of the clutch brake may be realized. Should the hub 46 become stuck on the shaft 43, it will be apparent that as soon as the pedal 39 has been depressed sufficiently to bring the housing 36 into contact with the facing 49, any further depression of the pedal 39 moving the housing 36 further toward the rear will tend to pull the shaft 43 back with it. If such a condition arose, and at the same time the hub 18 of the driven member resisted any end movement of itself on the pin 19, the tendency would be to pull the center out of the flexible disc 42, and if the movement was great enough the disc 42 might be permanently ruptured. To overcome such a possibility, the hub 18 is provided with one or more axially parallel headed pins 51 which extend loosely through the forward flanged end of the driven shaft 43 with the head lying a small distance back of the rear face thereof. With these pins 51 in place, if the driven member resists the following back of the shaft 43, as soon as the latter has moved rearwardly an amount to take up the clearance between the head of the pin 51 and its rear face, the driven member will be caused to positively move back therewith, and any possible rupture of the disc 42 is prevented.

While the present invention is shown in the drawings in connection with a disc type of clutch, it will be readily apparent that it may equally well be adapted for use in connection with a cone or other type of clutch, and that such adaptation is within the province and skill of the ordinary person skilled in this branch of the art.

Formal changes may be made in the specific embodiment of the invention described without departing from the spirit and substance of the broad invention, the scope of which is commensurate with the appended claims.

What I claim is:—

1. In a driving mechanism for motor vehicles, a driving shaft having a relatively immovable clutch face member, a driven clutch plate member slidably and rotatably supported on said driving shaft, a rotatable and axially movable driven shaft, means flexibly connecting said driven shaft with and supporting one end thereof on said plate member comprising a thin metal disc provided with a plurality of concentric corrugations, a third shaft, and means slidably connecting said driven shaft to said third shaft.

2. In a driving mechanism for motor vehicles, a driving shaft provided with a member having a flat annular surface, a relatively rotatable and axially movable driven member provided with a complementary flat annular surface supported by said driving shaft, a relatively non-rotatable and axially movable ring carried by said driving member, means for clamping said driven member between said ring and said driving member at will, an axially movable driven shaft, a thin metal disc provided with a plurality of concentric corrugations securing said driven shaft to said driven member, a third shaft, and slidable means joining said driven shaft and said third shaft.

3. In a driving mechanism for a motor vehicle, a driving shaft having a relatively immovable clutch face member, a driven clutch friction member rotatably supported against angular displacement with respect to the axis of said driving member, a relatively nonrotatable and axially movable ring carried by said driving member, means for clamping said driven member between said ring and said driving member at will, a driven shaft, and a flexible disc member joining said friction member with said driven shaft and forming the sole support for an end of said driven shaft.

Signed by me at Detroit, Michigan. U. S. A., this 28th day of February, 1925.

VINCENT LINK.